United States Patent [19]

Ljung et al.

[11] 4,190,364
[45] Feb. 26, 1980

[54] RING LASER GYROSCOPE

[75] Inventors: Bo H. G. Ljung, Wayne, N.J.; George R. Gamertsfelder, Pleasantville, N.Y.

[73] Assignee: The Singer Company, Little Falls, N.J.

[21] Appl. No.: 831,114

[22] Filed: Sep. 7, 1977

[51] Int. Cl.² .................... G01B 9/02; G01P 9/00
[52] U.S. Cl. ................................................. 356/350
[58] Field of Search .................... 356/106 LR, 350

[56] References Cited

U.S. PATENT DOCUMENTS

| 3,373,650 | 3/1968 | Killpatrick | 356/106 LR |
| 4,000,947 | 1/1977 | Grant, Jr. | 356/106 LR |

*Primary Examiner*—Vincent P. McGraw
*Attorney, Agent, or Firm*—T. W. Kennedy

[57] ABSTRACT

The invention is concerned with angular rate sensors, and particularly with ring laser gyroscopes which includes means for compensating for the effects of temperature gradients and residual lock-in. A ring laser gyroscope is provided which has a triangular block configuration, and which incorporates a triangular-shaped laser resonant cavity defined by three corner mirrors, including an output mirror. The ring laser gyroscope of the invention includes an optical wedge and a prism attached to its output mirror which permit the center of support of the gyroscope to be located in the plane of symmetry of the block. The gyroscope is mechanically vibrated about its center of gravity to prevent lock-in effects at low angular input rates. The construction of the gyroscope reduces temperature gradients across the plane of symmetry of the instrument, which temperature gradients produce spurious output signals in the absence of an input angular rate. The optical wedge and prism, together with an external corner cube retro-reflector, form an interferometer which provides compensation for the output signal of the gyroscope, enabling the gyroscope to produce an output free from the influence of the mechanical vibrations over a substantial angle, and which permits large angle low frequency mechanical vibrations to be introduced to prevent lock-in effects, which large angle low frequency vibrations have no tendency to cause residual lock-in effects to occur which produce non-linearities in the scale factor of the laser.

5 Claims, 3 Drawing Figures

RING LASER GYROSCOPE

RELATED COPENDING PATENT APPLICATIONS

Ser. No. 782,460, filed Mar. 29, 1977, Bo Hans Gunnar Ljung.

BACKGROUND OF THE INVENTION

The usual prior art angular rate sensors include a spinning mass to provide a reference direction. However, such sensors have inherent problems which include high drift rates caused by friction and unwanted torques. The ring laser gyroscope, for the most part, overcomes the problems inherent in the prior art sensors. The operation of the ring laser gyroscope is predicated entirely on optical and electronic principles, and angular motion of the ring laser gyroscope is measured by massless light waves circulating in a closed path.

Ring laser gyroscopes are illustrated and described in U.S. Pat. Nos. 3,373,650 and 3,467,472, which issued in the name of Joseph E. Kilpatrick. The ring laser gyroscopes shown and described in the patents include a triangular block which forms a triangular-shaped ring laser cavity defined by three corner mirrors. A triangular-shaped block is preferred since it requires a minimal number of mirrors. The cavity is filled by a gas laser which comprises, for example, helium and neon gas, usually operating at one of two wavelengths; specifically, either at 1.15 micrometers in the infrared spectral band, or at 0.63 micrometers in the visible wavelength region.

Through proper choice of the ratios of the two neon isotopes $Ne^{20}$ and $Ne^{22}$ in the gas mixture, two monochromatic laser beams are created. The two laser beams respectively travel in clockwise and counterclockwise directions around the triangular cavity in the same closed optical path.

With no angular motion about the input axis of the ring laser gyroscope, the lengths of the two laser beams are equal, and the two optical frequencies are the same. Angular movement of the prior art ring laser gyroscope in either direction about its input axis causes an apparent increase in the cavity length for the beam travelling in the direction of such angular movement and a corresponding decrease for the beam travelling in the opposite direction. Because the closed optical path is a resonant cavity providing sustained oscillation, the wavelength of each beam must also increase or decrease accordingly. Angular movement of the ring laser gyroscope in either direction about its input axis, therefore, causes a frequency differential to occur between the two beam frequencies, and which differential is proportional to the angular rate.

In accordance with the prior art practice, the two beams are extracted from the laser at its output mirror, and they are heterodyned in a beam combiner to produce an interference pattern. The interference pattern is detected by a photodetector which senses the beam frequency of the heterodyned optical frequencies of the two beams, and this beat frequency is a measure of the angular rate.

A difficulty arises in ring laser gyroscopes at low angular rates, in that the frequency differential between the two beams is small at the low rates, and the beams tend to resonate together, or "lock-in" so that the two beams oscillate at only one frequency. It therefore is difficult to read low angular rates because the frequency differential proportional to the angular rate does not exist. A technique is described in U.S. Pat. Nos. 3,373,650 and 3,467,472 for obviating such lock-in at the low angular rates. This technique comprises subjecting the sensing apparatus to a mechanical vibrating effect so that the beams appear to be circulating at a rate higher than the lock-in rate.

Ring laser gyroscopes are sensitive to temperature gradients across their line of symmetry since such gradients affect the Langmuir flow. The Langmuir flow is caused by cataphoretic pumping between the anode and cathode of the laser, and the flow is usually well balanced by careful matching of the capillary bores which contain the glow discharge, and by the utilization of two symmetrically placed glow discharges. The Langmuir flow is also usually balanced in the prior art gyroscopes by maintaining a constant current discharge in the two glow discharges by means of two active regulators.

The prior art ring laser gyroscopes, such as described above, are extremely sensitive to environmental and warm-up temperature changes. Such temperature changes produce temperature gradients across the plane of symmetry of the prior art gyroscopes, this being due to the lack of symmetry of the triangular block. These gradients result in the appearance of spurious output pulses in the absence of any angular movement of the instrument about its input axis. The block of the prior art ring laser gyroscope is purposely made asymmetrical so as to facilitate the prevention of lock-in by the mechanical vibration described above. As explained, lock-in has a tendency to occur at the low input angular rates, as the angular input falls below a certain critical or threshold value, and in a region where a non-linear relationship exists between the input and output of the gyroscope. A substantially linear relationship exists between the input and output of the gyroscope above the lock-in region.

The prior art ring laser gyroscopes are mechanically vibrated at a relatively high frequency in a range, for example, of 100–200 Hz. Residual lock-in effects are evident in such prior art gyroscopes which cause discrete non-linearities between the inputs and outputs thereof. It is common practice in the prior art to use a pseudo-random dither motion in an attempt to reduce such non-linearities.

Similar to the unit described in the copending application, the present invention also provides a gyroscope which includes a block having a triangular-shaped ring laser resonant cavity defined by three corner mirrors, including an output mirror. A gas laser is an integral part of the cavity which provides monochromatic light, and which comprises a capillary glow discharge in a helium and neon gas mixture. A case is provided with a support post. The block is supported on the case by a bearing (not shown) centered at point A on the line of symmetry of the block. A number of springs, all located in the plane of symmetry of the cavity, are provided to support the block at its center on the post. Like the unit in the copending application, no asymmetrical cut-outs, or displaced holes, are provided in the structure of the present invention, so that any change in environmental or warm-up temperature does not produce temperature gradients across the line of symmetry of the instrument.

SUMMARY OF THE INVENTION

In the construction of the present invention, an optical wedge composed of glass, glass-ceramic, or other appropriate material, has one side mounted on the outer side of the output mirror of the unit, and the other side of the wedge is affixed to a prism. The wedge and prism cause the output beam to be angularly displaced and directed to a stationary corner cube retro-reflector. The proper choice of the wedge angle causes the sensitivity of the resulting interferometer to be equal and opposite to that of the ring laser when the laser is mechanically vibrated about its central symmetry point, so that the desired compensation may be achieved. The retro-reflected beam interacts with the other output beam from the ring laser gyroscope over an extended mechanical vibration angle, permitting low frequency wide angle mechanical vibrations to be utilized. The objective of the assembly is to enable low frequency mechanical vibrations to to used to prevent lock-in, and thereby to avoid residual lock-in effects caused by high frequency mechanical vibrations, as were required in the prior art structures.

DETAILED DESCRIPTION OF THE ILLUSTRATED EMBODIMENT

Figure 1:
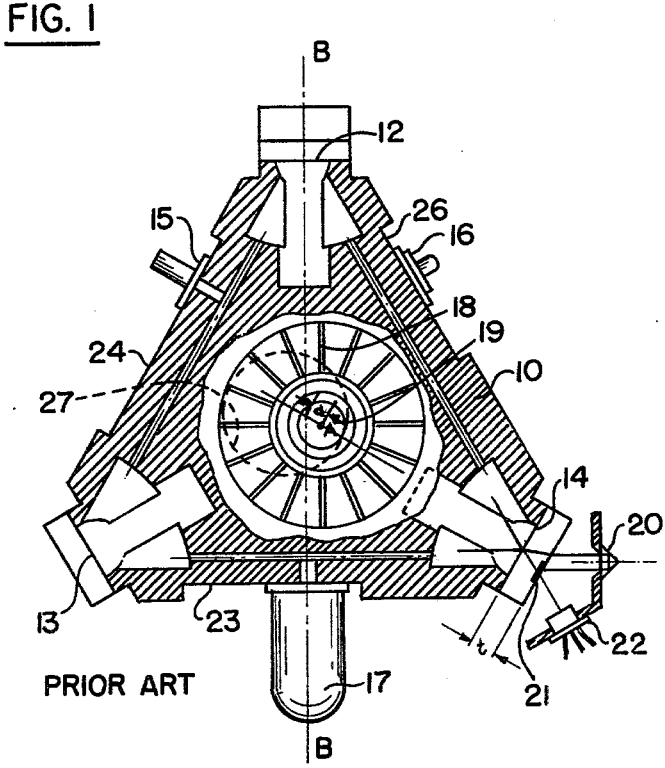
FIG. 1 is a schematic representation of a prior art ring laser gyroscope which is sensitive to temperature gradients across its plane of symmetry.

FIG. 1 illustrates a prior art ring laser gyroscope of the type discussed above. The gyroscope of FIG. 1 comprises a triangular block 10. Block 10 may be formed, for example, of a helium diffusion resistant glass ceramic of low thermal expansion such as "Cervit 101" presently being sold by the Owens-Illinois Glass Company, or "Zerodur" presently being sold by the Schott Glass Company. A cavity is formed in block 10 which is defined by two highly reflective mirrors 12 and 13, and an output mirror 14. The unit of FIG. 1 also includes two anodes 15 and 16, and a cathode 17. The cavity is filled with a mixture of helium and neon gases. A plasma discharge between the two anodes and the cathode provides the necessary gain in the gas-filled cavity. Two monochromatic light beams are directed by the mirrors around the block in clockwise and counterclockwise directions respectively.

Block 10 is resiliently coupled to the base by means of a spring 18, the spring being attached to a support post 19 mounted on a case. The block may be driven by external piezoelectric actuators (not shown) to vibrate in a pseudo-random manner about point A. The purpose of this mechanical vibration, as explained above, is to introduce an input angular rate which is high enough to obviate the lock-in effect.

An interferometer assembly is provided in the form of a half-silvered mirror 21 mounted on the output mirror 14; and a corner cube retro-reflective 20 and photodector 22 mounted on the case adjacent to the half-silvered mirror 21. The clockwise and counterclockwise monochromatic light beams are combined at the half-silvered mirror 21, and the resulting heterodyning of the two beams is detected by the photodetector 22.

The interferometer formed by retro-reflector 20, half-silvered mirror 21 and photodetector 22 causes the two optical beams to be re-united after traversing different optical paths. Point A in FIG. 1 is selected so that off-set d is equal to the thickness t of mirror 14. Then, the sensitivity of the interferometer is equal and opposite to that of the ring laser gyroscope output when the gyroscope is mechanically vibrated around point A. The interferometer enables precise recovery of the actual input angular rate to which the ring laser is being subjected.

In the prior art assembly of FIG. 1, the clockwise and counterclockwise monochromatic light beams are combined so that a small angle of convergence is formed between the two beams when they reach photodetector 22. In this way, an interference pattern is formed which consists of two or more light areas interspaced by dark areas. The resulting interference pattern moves to either side depending on the direction of rotation of the ring laser. The direction of rotation of the laser can therefore be sensed by dividing photodetector 22 into two areas spaced at one quarter the distance between the bright areas in the interference pattern.

Asymmetrical cut-outs 23, 24 and 26 together with a displaced hole 27, are formed in the block 10 of the prior art unit of FIG. 1 to balance the block mechanically about its support post 19. Such balancing is necessary in the prior art unit due to the offset of point A from the line of symmetry of the block, in order to avoid mechanical coupling of the unit with external sources of linear vibration.

A disadvantage inherent in the prior art ring laser gyroscopes shown in FIG. 1 is that it is extremely sensitive to temperature gradients across its line of symmetry B—B. These gradients change the gas flow in the cavity, and result in the instrument producing spurious output pulses at times when no input angular rate is being introduced thereto. This situation occurs when there is a change in temperature due, for example, to environmental temperature changes or to temperature changes during warm-up of the unit. These temperature gradients occur because of the asymmetrical configuration of the block 10 of FIG. 1. The time constants involved in the temperature gradients are of the order of hours.

A further disadvantage of the prior art ring laser gyroscope of FIG. 1 is that the mechanical vibration rate is restricted approximately to ±0.5°. This restriction arises because the reflected beam from retro-reflector 20 coincides with the other output beam only for extremely small vibrational angles. In the prior art unit of FIG. 1, it is therefore impossible to heterodyne the two beams for mechanical vibrational angles larger than ±0.5° since no output exists for the larger vibrational angles. This necessitates the use of relatively high frequency mechanical vibrations in the prior art unit which, in turn, cause residual lock-in non-linearities between the input and output of the unit. Moreover, the high frequency vibrations also has a tendency to disturb adjacent instruments such as accelerometers and gyroscopes normally used in inertial guidance systems.

Figure 2:
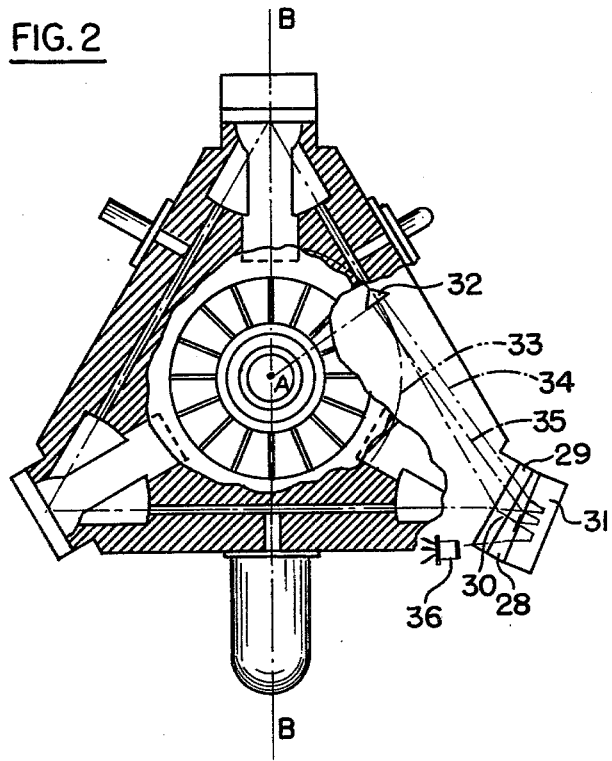
FIG. 2 is a schematic representation of the improved ring laser gyroscope of the present invention, showing an attached wedge and prism, which together with a corner cube retro-reflector, form an interferometer for purposes to be described.
Figure 3:
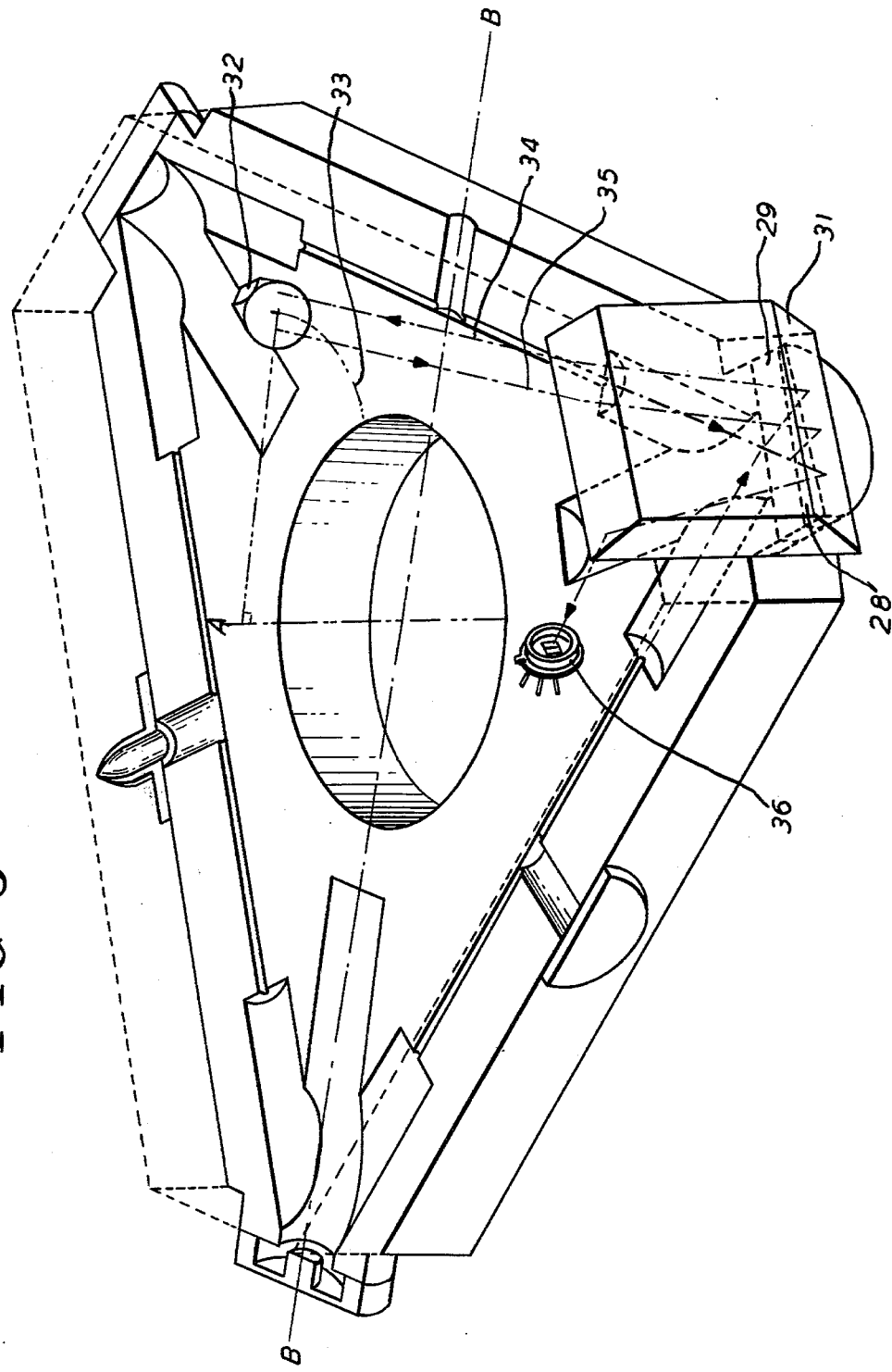
FIG. 3 is a partially cut-away view of the instrument of FIG. 2, on an enlarged scale, and which is particularly useful in describing the operation of the ring laser gyroscope of the invention.

The above-described disadvantages of the prior art ring laser gyroscope are overcome by the construction of the ring laser gyroscope of the present invention, one embodiment of which is shown in FIGS. 2 and 3. The structure of the embodiment of FIGS. 2 and 3 in some respects is similar to the prior art unit of FIG. 1, and only the modifications constituting the teaching of the present invention will now be discussed in detail.

In the ring laser gyroscope of FIGS. 2 and 3, and as was the case in the unit described in the copending application, the center of spring 18 and its support post 19, that is, point A, is located on the line of symmetry B—B, rather than being displaced therefrom as is the case in the unit of FIG. 1; there is no requirement for the asymmetrical cut-outs 23, 24, 26 or of hole 27, in the block of the ring laser gyroscope of FIGS. 2 and 3.

In the practice of the invention, in the illustrated embodiment, an optical wedge 28 is attached to the output mirror 29 of the gyroscope by any suitable transparent optical adhesive. Optical wedge 28 may be formed of a glass ceramic material such as designated by the name "U.L.E.", which is a trademark of the Corning Glass Company, and which is used by that company to identify a brand of ultra-low expansion silicon, which is a titania-stabilized glass ceramic. The material is water clear, and it affords a good thermal expansion match to the laser block. A good thermal match is necessary between wedge 28 and the block in order to avoid optical birefringence due to thermally induced stresses. Optical wedge 28 includes a half-silvered coating 30. All external surfaces of the optical elements are preferably coated with appropriate anti-reflective material to reduce losses.

The ring laser gyroscope of FIGS. 2 and 3 includes a retro-reflector 30 which is mounted on the case, and which typically may be a corner cube retro-reflector. The retro-reflector 32 is mounted so that its optical center is located on a sensitivity circle 33. Circle 33 is centered at point A, and has a radius $$r = 2B/L$$

Where:
L is the path length of the cavity;
B is the area enclosed by the path.

The face of retro-reflector 32 may also be coated with appropriate anti-reflective material. The retro-reflector is mounted in a slightly off-set position in order to avoid surface reflections from the retro-reflector from being directed back into the laser cavity.

A right angle prism 31 is attached to the outer face of wedge 28 by an appropriate transparent optical adhesive. Wedge 28 causes the counterclockwise beam to be angularly displaced, so that the counterclockwise beam, after two reflections in the ring angle prism 31, is directed as beam 34 towards the retro-reflector 32. Beam 34 is intercepted by retro-reflector 32 and is directed back as beam 35 to the prism 31.

The optical elements described above form an interferometer whose sensitivity is exactly equal and opposite to that of the ring laser gyroscope, when the gyroscope is mechanically vibrated around point A. The optical elements are positioned so that the beam 34 entering the retro-reflector 32, and the beam 35 leaving the retro-reflector 32, are parallel to one another and perpendicular to the radius of sensitivity circle 33. When beam 35 reaches wedge 28 it is reflected by the half-silvered mirror coating 30. The clockwise direction beam passing through the output mirror 29 is transmitted through the half-silvered mirror coating 30. The clockwise beam and beam 35 are coincident and, after further reflections in prism 31, the two beams are directed to a photodetector 36 which is rigidly attached to the block.

The coincident beams are heterodyned in detector 36 to form the desired interference pattern. The small convergence angle necessary to form the interference pattern is created by either making output mirror 29 wedge-shaped by a few minutes of arc, or by attaching wedge 28 to mirror 29 by optical adhesive such that the adhesive forms the desired wedge angle.

In the ring laser gyroscope of FIGS. 2 and 3, the optical wedge 28, prism 31 and retro-reflector 32 form an interferometer by means of which the output from the gyroscope is compensated to produce an output free from the influence of the induced mechanical vibration over a considerable angle, thereby permitting a large angle low frequency vibration to be introduced into the instrument so as to render the instrument essentially free from residual lock-in effects which adversely affect its scale factor. Moreover, the construction of the invention permits the ring laser gyroscope to be supported on its line of symmetry, so that the adverse effects of temperature gradients across the instrument are materially reduced.

In a second embodiment of the invention, the clockwise and counterclockwise beams from separate output mirrors may be directed through wedges and prisms, such as wedge 28 and prism 31, towards a beam combiner, such as retro-reflector 32, located on the sensitivity circle 33. However, careful control of tolerances is required in the second embodiment since there are no error cancelling effects which take place in the embodiment of FIGS. 2 and 3. The error cancelling in the embodiment of FIGS. 2 and 3 occurs because the beams pass both ways through prism 31.

The invention provides, therefore, an improved ring laser gyroscope in which the block is mounted on its line of symmetry, and which does not require balance cut-outs or displaced holes. This mounting of the block in the instrument of the invention renders the instrument insensitive to temperature differentials which occur during warm-up and during changes in environmental temperature. The ring laser gyroscope of the invention is constructed to permit an approximate tenfold increase in allowable mechanical vibration angle as compared with the prior art unit of FIG. 1, which makes it practical to use a large angle, low frequency vibration to prevent lock-in effects. Such a large angle, low frequency vibration produces less residual lock-in effects than high frequency vibrations and, accordingly, the pseudo-random motion necessary in high frequency vibrations can be reduced.

A further advantage of the instrument of the invention is that the output mirror can be placed on the block in an optimal position to minimize back scatter. This is not possible in the prior art instrument of FIG. 1, because the output mirror includes a half-silvered portion 21 for the reasons described above, and it must be placed on the block in a fixed position in which the half-silvered mirror is properly located in a particular optical path.

Yet another advantage of the instrument of the invention is that the retro-reflector beam combiner 32 in the embodiment of FIGS. 2 and 3 requires less space than the beam combiner 20 in the prior art unit of FIG. 1.

It will be appreciated that although various embodiments of the invention have been shown and described, modifications may be made. It is intended in the following claims to cover all the modifications which come within the true spirit and scope of the invention.

What is claimed is:

1. A ring laser gyroscope including:
   a symmetrical block having a ring laser resonant cavity therein in which two laser beams are created;
   reflective means, including an output mirror, mounted on said block for propagating the two laser beams in a closed loop in clockwise and counterclockwise directions around an input axis of the gyroscope;
   a support means for the block positioned on the line of symmetry of the block having an axis extending along the input axis of the gyroscope;
   resilient means mechanically coupling the block to the support means to permit angular movement of the block around the input axis;
   a photodetector;
   comepnsating interferometer means for causing the output from the gyroscope to be free from the influence of mechanical vibrations introduced to the block about the input axis over a substantial angular displacement of the block, comprising a stationary retro-reflector, an optical wedge attached to the outer surface of the output mirror, and a prism attached to the outer surface of said wedge for directing one of the laser beams to the retro-reflector and for directing the other laser beam and a reflected beam from the retro-reflector to the photodetector, the laser beam directed to the retro-reflector and the reflected laser beam from the retro-reflector travelling along two parallel paths displaced from one another.

2. The ring laser gyroscope defined in claim 1, and which includes a half-silvered coating on a portion of the surface of said wedge adjacent to said output mirror for directing the reflected beam from the retro-reflector, as reflected by said prism to said half-silvered coating, back into the prism for reflection by the prism to the detector, and for passing the other laser beam into the prism for reflection by the prism to the detector.

3. The ring laser gyroscope defined in claim 1, in which said prism and said optical wedge are attached to one another and to the outer surface of the output mirror by an optical adhesive and said wedge being selected to afford a thermal expansion match so as to avoid optical birefringence due to thermally induced stresses.

4. The ring laser gyroscope defined in claim 1, and which includes an adhesive layer attaching the optical wedge to the output mirror, said adhesive layer having a wedge-shape to form a selected wedge angle between the optical wedge and the output mirror so as to cause the beams incident on said detector to form a predetermined interference pattern.

5. The ring laser gyroscope defined in claim 1, in which said prism is a right-angle prism positioned such that the optical center of said retro-reflector is located on a radius r from the input axis of the gyroscope; where $r = 2B/L$, and where L is the length of said closed loop, and B is the area enclosed by said enclosed loop.

* * * * *